Jan. 25, 1938.   C. A. BEAUMONT ET AL   2,106,399
SAFETY TREAD
Filed Aug. 12, 1935
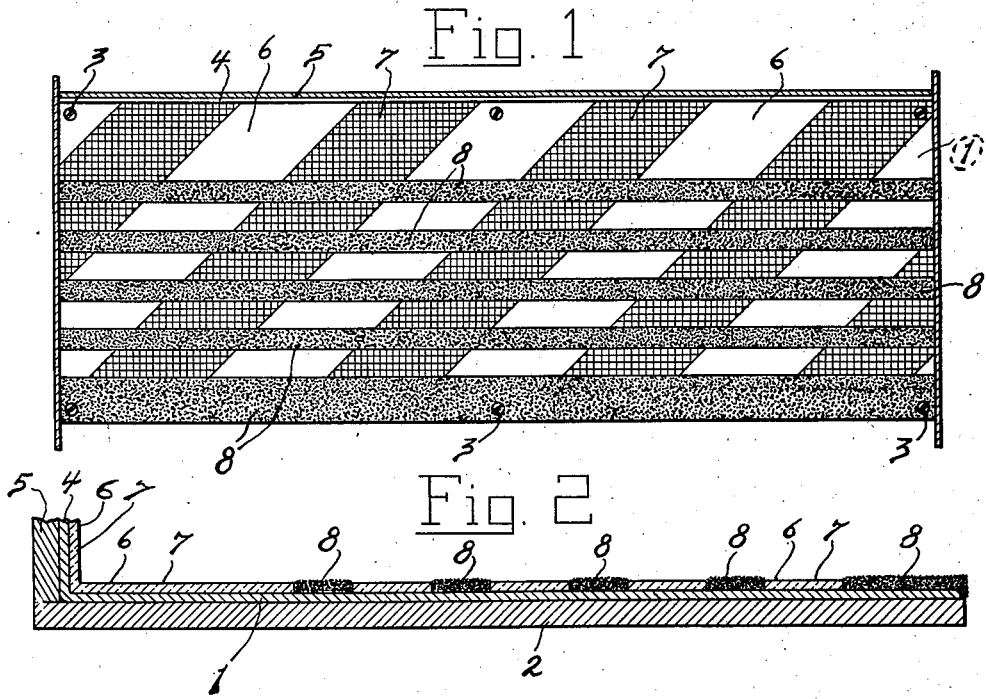
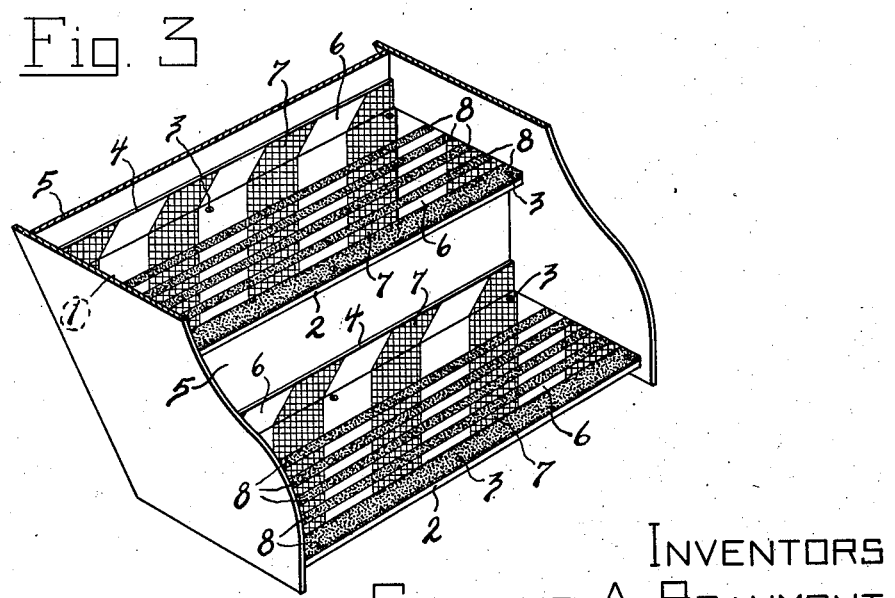
INVENTORS
CHARLES A. BEAUMONT
FRANK SHERRITT
BY Robert F. Michle, Jr.
ATTY.

Patented Jan. 25, 1938

2,106,399

UNITED STATES PATENT OFFICE 2,106,399

SAFETY TREAD

Charles A. Beaumont, Decatur, and Frank Sherritt, Chicago, Ill.

Application August 12, 1935, Serial No. 35,800

5 Claims. (Cl. 20—79)

Our invention relates particularly to safety treads for vehicle steps, although not limited to this use alone.

The main object of the invention resides in the provision of a safety tread which involves both an attention attracting and anti-slip character, particularly with a view toward vehicle steps and the prevention of personal injuries relating thereto.

With this object in view our invention consists in certain features of novelty in the construction, combination, and arrangement of parts by which the said object and certain other objects, hereinafter appearing, are effected, all as fully described with reference to the accompanying drawing and more particularly pointed out in the appended claims.

In the said drawing—

Figure 1 is a partial top plan sectional view of a vehicle step structure provided with the safety tread of our invention;

Figure 2 is an enlarged partial section of the same taken on a vertical transverse plane thereof; and Figure 3 is a partial perspective view of a vehicle step structure provided with the safety tread of our invention.

Referring to the drawing, 1 designates a base, preferably formed of sheet metal such as sheet steel, and adapted to be secured on the upper surface of a support, such as a step 2 of a railway car by means of screws 3 passing through holes in the base. Where the tread is applied to a step, as shown, it is preferably provided with a vertical or riser portion 4 at the inner edge of the main or tread portion thereof, which riser portion extends upwardly from the main or tread portion thereof at a right angle thereto to lie against a riser 5 of the step 2.

The base 1 including the riser portion 4 thereof is provided with contrasting color sections or strips 6 and 7, preferably white and black respectively, and these strips are preferably arranged diagonally of the tread and riser portions thereof, these contrasting color sections or strips serving to attract attention and thus reduce accidents. These contrasting color sections or strips are preferably formed by vitreous enamel of contrasting color sections or strips adhered to the base 1 in the usual manner.

The tread portion of the base 1 has at least a portion thereof of irregular surface anti-slip character which, as shown, is in the form of spaced parallel strips 8 extending longitudinally of the tread, these strips 8 preferably interrupting the color strips 6 and 7 and being arranged at an acute angle thereto.

The strips 8, being of irregular surface anti-slip character, also serve to reduce accidents, and the surfaces thereof are preferably disposed at a higher level than that of the color strips 6 and 7, as shown in Figure 2, to ensure good contact. The outer of the strips 8 is preferably relatively wide and is disposed at the outer edge portion of the tread where the anti-slip surface is of relatively great importance.

The strips 8 of anti-slip character are preferably formed by spraying melted metal, such as steel, upon the base 1 in a well known manner to weld the melted metal to the base in granular form to form the irregular surface of anti-slip character, the metal of the strips 8 being built up to a level higher than that of the contrasting color sections or strips 6 and 7, it being observed that the strips 8 are formed on the base independently of the contrasting color sections or strips 6 and 7.

Thus it will be observed that a durable safety tread is provided which promotes safety both by attracting attention and by providing against slipping.

While we have described and shown the preferred embodiment of our invention we do not wish to be limited to the precise details of construction as changes may readily be made without departing from the spirit of our invention, but having thus described our invention, we claim as new and desire to secure by Letters Patent the following:

1. A safety step tread provided with a tread surface having contrasting color strips arranged diagonally of the tread and having spaced parallel strips of irregular surface anti-slip character arranged longitudinally of the tread and interrupting said color strips.

2. In a safety tread the combination with a metal base, of means providng a tread surface thereon having contrasting color sections and sections of anti-slip character surface, said means comprising material adhered to said base to provide said contrasting color sections and metallic material welded to said base in granular form independently of said first mentioned material to provide said sections of anti-slip character.

3. In a safety tread the combination with a metal base, of means providing a tread surface thereon having contrasting color sections and sections of anti-slip character surface, said means comprising vitreous enamel adhered to said base to provide said contrasting color sections and metallic material welded to said base in granular form independently of said vitreous enamel to provide said sections of anti-slip character.

4. In a safety tread the combination with a metal base, of means providing a tread surface thereon having contrasting color sections and sections of anti-slip character surface, said means comprising material adhered to said base to provide said contrasting color sections and metallic material welded to said base in granular form independently of said first mentioned material and built up to a level higher than that of said first mentioned material to provide said sections of anti-slip character.

5. In a safety tread the combination with a metal base, of means providing a tread surface thereon having contrasting color sections and sections of anti-slip character surface, said means comprising vitreous enamel adhered to said base to provide said contrasting color sections and metallic material welded to said base in granular form independently of said vitreous enamel and built up to a level higher than that of said vitreous enamel to provide sections of anti-slip character.

FRANK SHERRITT.
CHARLES A. BEAUMONT.